Figure 1:
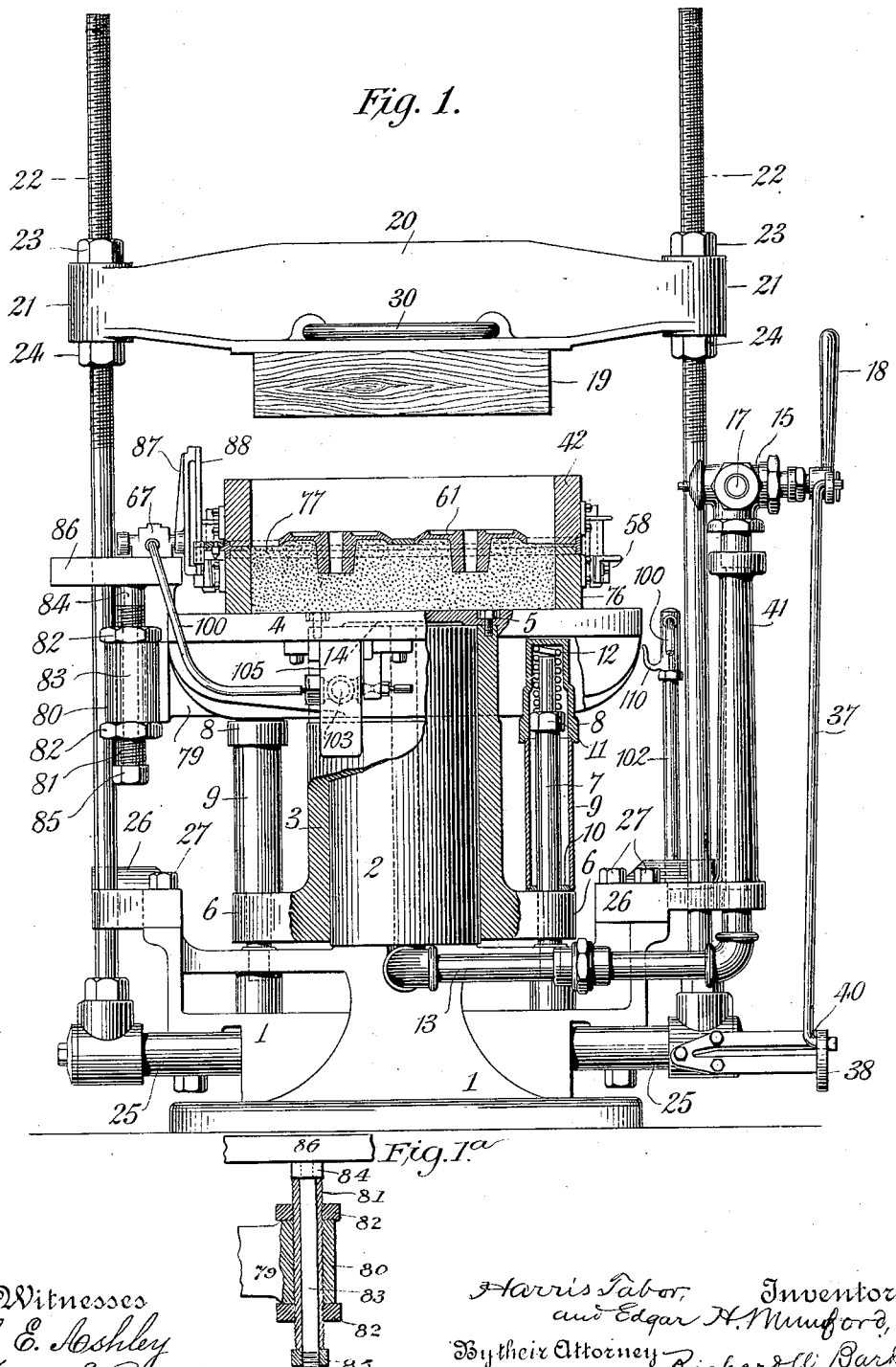

No. 654,292. Patented July 24, 1900.
H. TABOR & E. H. MUMFORD.
MOLDING MACHINERY.
(Application filed June 6, 1899.)
(No Model.) 4 Sheets—Sheet 1.

Fig. 1ᵃ

Witnesses
C. E. Ashley
James E. Ryall

Inventors
Harris Tabor
and Edgar H. Mumford,
By their Attorney
Richard C. Barkley No. 654,292. Patented July 24, 1900.
H. TABOR & E. H. MUMFORD.
MOLDING MACHINERY.
(Application filed June 6, 1899.)
(No Model.) 4 Sheets—Sheet 2.
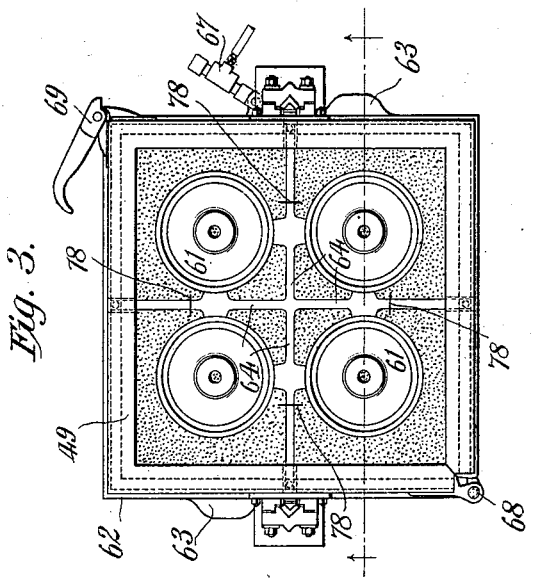
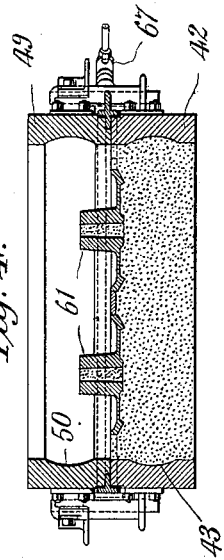
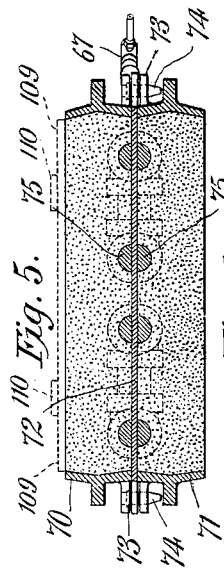
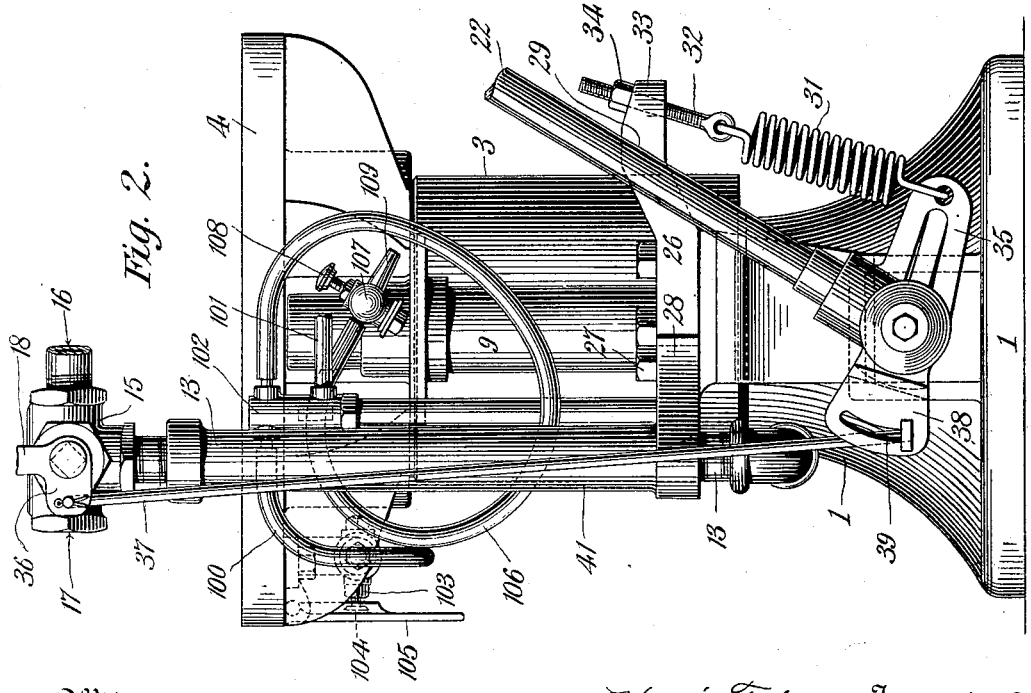
Witnesses
C. E. Ashley
Francis E. Ryall
Harris Tabor Inventors.
and Edgar H. Mumford,
By their Attorney
Richard N. Backey.
THE NORRIS PETERS CO., PHOTO-LITHO., WASHINGTON, D. C.

No. 654,292. Patented July 24, 1900.
H. TABOR & E. H. MUMFORD.
MOLDING MACHINERY.
(Application filed June 6, 1899.)
(No Model.) 4 Sheets—Sheet 3.
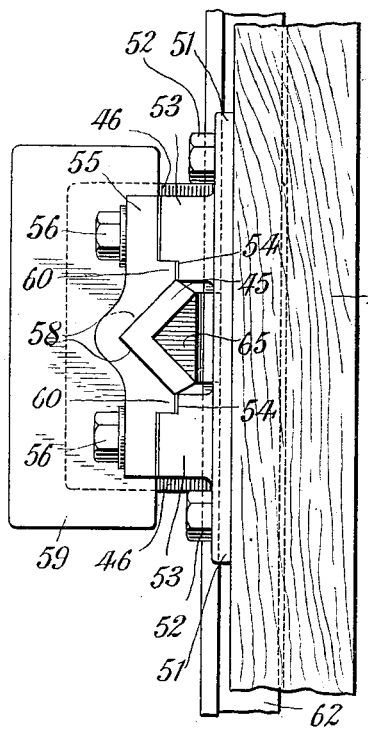
Fig. 6,
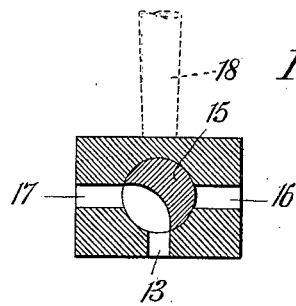
Fig. 12,
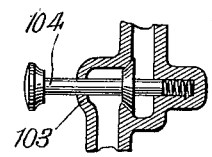
Fig. 13.
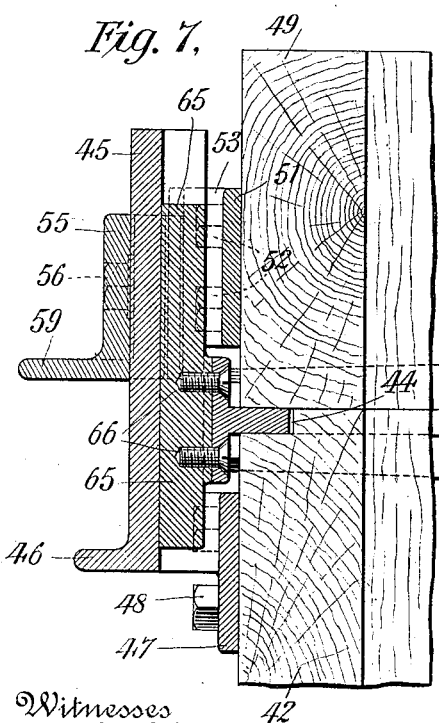
Fig. 7,
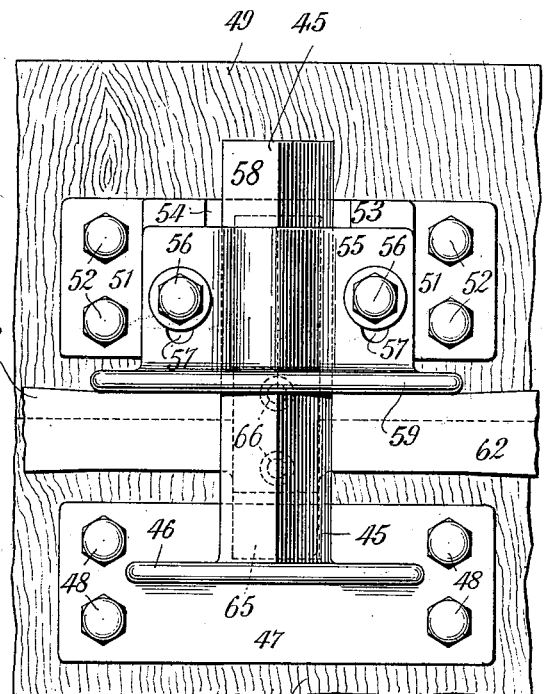
Fig. 8.
Witnesses
C. E. Ashley
Francis E. Ryall
Inventors:
Harris Tabor &
Edgar H. Mumford,
By their Attorney
Richard W. Barkley No. 654,292. Patented July 24, 1900.
H. TABOR & E. H. MUMFORD.
MOLDING MACHINERY.
(Application filed June 6, 1899.)
(No Model.) 4 Sheets—Sheet 4.
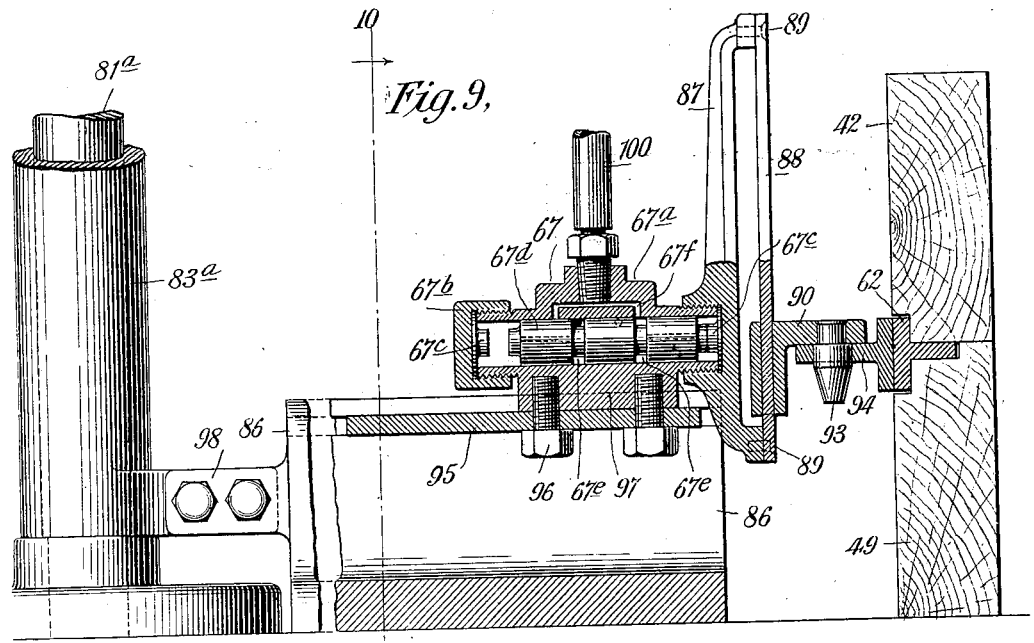
Fig. 9.
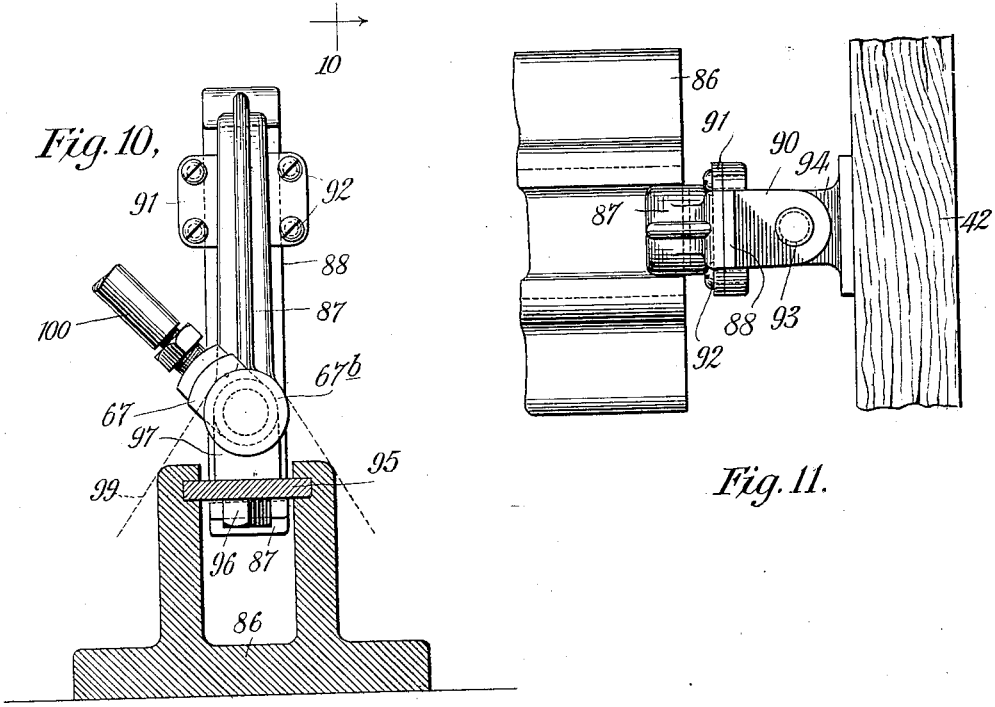
Fig. 10.
Fig. 11.
Witnesses
C. E. Ashley
Francis E. Ryall
Harris Tabor, Inventors:
and Edgar H. Mumford,
By their Attorney
Richard W. Barkley.

UNITED STATES PATENT OFFICE.

HARRIS TABOR, OF ELIZABETH, AND EDGAR H. MUMFORD, OF PLAINFIELD, NEW JERSEY, ASSIGNORS TO THE TABOR MANUFACTURING COMPANY, OF ELIZABETH, NEW JERSEY.

MOLDING MACHINERY.

SPECIFICATION forming part of Letters Patent No. 654,292, dated July 24, 1900.

Application filed June 6, 1899. Serial No. 719,631. (No model.)

*To all whom it may concern:*

Be it known that we, HARRIS TABOR, a resident of Elizabeth, and EDGAR H. MUMFORD, a resident of Plainfield, county of Union, and State of New Jersey, citizens of the United States, have invented certain new and useful Improvements in Molding Machinery, of which the following is a specification.

The present invention relates to molding machinery in general, and more especially to apparatus for producing molds for that large range of light castings which are still produced entirely by hand or by machine ramming and the patterns drawn by hand. Some of the objections to the formation of molds for such castings by other than hand methods are, first, the difficulty and cost of mounting the patterns on parting-plates, since the parting-lines separating the parts of the flask are usually irregular and the plate must conform thereto nevertheless, and, second, in those cases where the patterns are drawn through a stripping or silhouette plate and where the patterns are placed on a plane (match) plate these plates form the parting or dividing lines between the different parts of the complete mold or flask, one side of the plate serving for one part of the flask during the ramming of the sand. These methods of molding always leave a trace of the joint, commonly called the "parting" or "joint" line in the casting, such parting or joint line being caused by the distinct line in the mold where the parts thereof close together. From this it follows, especially in match-plate work, that the amount of this line or the displacement of one part of the casting relative to the other part—*i. e.*, of a half or part pattern relative to the other half or part when forming the mold—depends upon the accuracy with which the respective parts of the patterns are placed upon the plates and in all cases upon the condition of the mold-frames and the fit of their dowels.

In the operation of producing or forming molds for light castings which require to be duplicates of the patterns as nearly as possible it is the custom of the hand molder to insert a rapping-spike through the top or cope portion of the flask into prepared holes in the patterns for the purpose of rapping the patterns while the mold or flask is closed, thus enlarging both parts of the mold at once. Under this procedure both parts of the mold are rapped while the patterns are in a position common to both parts of the mold, thus tending to the production of the finest work; but it has the serious objection of providing no limits to the enlargement of the mold by the blows of the molder's mallet or hammer as he raps the pattern, whence castings of various sizes are obtained where uniformity is desired. Another objection to the present hand method when counterparts of the patterns are demanded is that due to the rapping of the patterns after the cope is removed and while the patterns are being drawn from the drag, since the most difficult parts of the patterns go to the drag or lower part of the mold, which enables the molder to remove the cope without distorting the mold, (the rapping-iron having been used as above described;) but the greater depth of the patterns in the drag calls for additional rapping of the patterns while they are drawn therefrom, so that even though the molder have a steady hand the lower part of the mold—that is, the drag—is apt to be enlarged beyond the pattern outlines in the cope and to be otherwise distorted, thus leading to the production of castings not true to pattern.

The main object of the present invention is the formation of molds which shall be the exact counterpart of the patterns used.

Another object is to simplify, improve, and increase the efficiency of molding-machines, and more especially those of the general type shown by Letters Patent of the United States granted January 29, 1895, and May 11, 1897, and bearing numbers 533,401 and 582,325.

Another object is to connect one and the same vibrator-engine or agitator with a number of patterns or their carriers or supports in succession even when these are of various sizes and various heights above a given plane, and other objects, as will hereinafter more fully appear.

To these ends the invention consists of features of construction and combinations of devices hereinafter described, and more particularly pointed out in the claims concluding this specification.

The preferred form of the invention is illustrated in the accompanying drawings, forming part of this specification, in which—

Figure 1 is a front elevation, partly broken away and partly in section, of a machine in which the invention is embodied. Fig. 1ᵃ is a sectional detail view. Fig. 2 is a side elevation, partly broken away, of the same, the mold being omitted and the rammer-carrier being thrown back. Fig. 3 is a plan view, and Fig. 4 is a sectional view on line 4 4 of Fig. 3, of a mold, a pattern-carrier, a vibrator, and guides. Fig. 5 is a sectional view of a mold, a vibrator, match-plate, and patterns. Fig. 6 is a plan, Fig. 7 a central vertical sectional view, and Fig. 8 a side view, of guides for mold parts and pattern-carrier. Fig. 9 is a detail side view, partly in section, of a rapping or vibrator engine, mold, and connections. Fig. 10 is a sectional view on line 10 10 of Fig. 9 looking in the direction of the arrows. Fig. 11 is a plan, with parts omitted, of the devices shown in Figs. 9 and 10. Fig. 12 is a diagram illustrating a two-way cock. Fig. 13 is a diagram illustrating a check-valve.

The same reference character will be used to designate the same part in the various figures of the drawings.

Referring to the drawings, the reference 1 indicates a suitable casting or metal base-frame which is furnished centrally with an upright piston 2, which forms a guide for the hollow cylinder 3.

4 is a table or mold-support, shown as attached to the cylinder 3 by headed screw-bolts 5 passing through countersunk holes in table 4 and engaging with threaded holes in cylinder 3. The cylinder 3 is provided at opposite sides with laterally-extending arms 6, which are provided with vertical perforations, through which rods 7 project from the base 1, the rods being screwed into the base. The table 4 has attached thereto underneath two caps 8, inclosing the upper ends of studs 7. Tubes 9 surround studs 7 between the caps 8 and the arms 6, setting into circular rabbets in caps 8 and outside of rings 10, resting on the arms 6. The studs 7 are reduced in diameter for some distance at their upper ends and are provided with nuts 11 to form abutments for spiral springs 12, which bear thereagainst and against the inside of caps 8. The springs 12 are under compression and form buffers for the table 4 when the latter descends, as hereinafter set forth. The table 4 and cylinder 3 are moved upwardly by means of a pipe 13, which opens into the space 14 between the upper closed end of piston 2 and the table 4. The flow of the compressed gas, as air or steam, is controlled by means of an admission and waste cock at 15, the admission being at 16 and the waste-orifice at 17 and the position of the cock being controlled by a handle 18.

When the cock is in position to admit pressure to the cylinder 3, the waste-orifice 17 is cut off from communication with the cylinder, and when the waste 17 is in communication with the cylinder the admission 16 is cut off from the cylinder 3. Above the table 4 is a rammer 19, preferably of wood, which is attached to a metal cross-head 20. The head 20 is provided with perforated eyes 21, through which rods 22 pass freely, but snugly, the rods being screw-threaded for a considerable distance at their upper ends and being provided each with nuts 23 and 24, respectively, above and below the eyes 21. The nuts 23 24 provide for the adjustment of head 20 along the rods 22. The rods 22 are journaled on a shaft 25, which is firmly attached to the base 1, and the swinging motion of the rods 22 is limited by stop-plates 26, which are firmly bolted to the base 1 by screw-bolts 27 and are provided with front and back stops 28 29, coacting with rods 22. The head 20 is provided with a suitable handle or bail 30 for the hand to grasp in pulling the rammer and head forward or in pushing them rearward. The weight of the rammer, the head, and the rods 22 may be nearly counterbalanced, as by spring 31, connected at one end to a screw-eyebolt 32, which passes freely through an arm 33 of a plate 26 and is provided with an adjusting-nut 34, and connected at the other end to an eye in the end of an arm 35, rigidly connected with shaft 25, the spring 31 (or springs 31, since the described construction may be employed at each side of the machine) tending to throw the arms 22 forward against stops 28.

In order to provide against the admission of steam or other pressure to the cylinder 3 while the rammer is turned back, (rods 22 against stops 29,) the handle 18 is formed as one arm of a bent or bell lever whose other arm 36 is connected by a rod 37 with a slotted arm 38, rigidly connected with shaft-sleeve, by which the right-hand rod 22 is journaled on the shaft 25. The slot 39 of the arm 38 is concentric with shaft 25 and is of a length such that the bent end 40 of rod 37 may have a travel due to a quarter-turn (more or less) of the handle 18, and the three-way cock 15 above named is arranged to admit air or steam to the cylinder 3 when in one position and to open the waste 17 when in another position, said positions being one-quarter turn (more or less) of the cock apart. The lever 36, rod 37, arm 38, slot 39, and end 40 are so arranged and proportioned as will secure that the end 40 shall be at the upper end of slot 39 when lever 18 and rods 22 are all upright or vertical and at the lower end of slot 39 when lever 18 is vertical and the rods 22 are tilted back against stops 29, and the cock 15 is arranged so that when lever 18 is vertical the waste 17 is in communication with the cylinder 3 and so that when lever 18 is turned forwardly (to the left in Fig. 2) to a horizontal position the steam or compressed air is admitted through pipe 16 to pipe 13 and to the cylinder 3; but it is not possible to turn handle 18 to admit pressure to the cylinder 3 when the rammer is turned back, (rods 22 against stop 29,) since the rod 37 cannot descend, owing to the fact that its end is at the bottom of slot 39; but when the rammer is in position over table 4 the handle 18 can be turned to admit pressure to the cylinder 3. The right-hand plate 26 may be formed with a hollow pedestal 41, through which pipe 13 passes with a space between the pipe and the pedestal, if desired, to prevent accidentally burning anything brought against the pedestal when steam is used.

The mold-frames (shown in Figs. 3, 4, 9, 10, and 11 of the drawings) will be described next. For convenience of description one frame will be referred to as the "cope" and the other frame as the "drag;" but it is to be understood that either frame shown may be used for either cope or drag.

The drag 42 is shown as a rectangular wooden frame, the inner sides of which may be dished, as at 43, (shown only in Fig. 4,) and one edge of which is rabbeted all the way around at 44, (see Fig. 7,) or the rabbet may be on the cope. (See Fig. 4.) At two opposite sides the drag 42 has V-shaped guide-bars 45, rigidly connected thereto by plates 46 and 47 and bolts 48. The openings of the V-shaped guides are toward and the guides are some distance away from the adjacent sides of the drag, and the plates 46 are at one end of the guides and are cut away between the guides 45 and the sides of the drag. (See Fig. 7.)

The cope 49 is similar to the drag in form and may have dished inner faces 50. (Shown only in Fig. 4.) Plates 51 are attached to the cope at two opposite sides thereof by screw-bolts 52, each plate being formed with two outstanding vertical rectangular parallel ribs 53, which are rabbeted at their inner edges, (rabbets marked 54,) and the distance between ribs 53 is substantially equal to the extreme width of the guides 45. Caps 55 are attached to the ribs 53 by threaded bolts 56, which pass through vertical slots 57 in the caps and engage threaded holes in the ribs. The caps 55 are formed with long V grooves or guides 58 (to fit the exterior V-surface of the guides 45) and with lateral plates or handles 59. Suitable liners between the meeting surfaces of ribs 53 and cap 55 may be employed for adjustment, as indicated in the drawings by the parallel lines, and the caps 55 have extensions 60 to fit between the parallel faces of the rabbets, as shown more clearly in Fig. 6.

As illustrated in Figs. 3 and 4, the patterns 61 may be rigidly connected with a frame 62, which surrounds the snap-flask formed by the cope and the drag. The frame 62 is shown as being T-shaped in cross-section, with the horizontal flange resting in the rabbet 44, and provided with symmetrically-disposed handles 63. The patterns 61 are shown as being connected rigidly with cross-bars 64, which bars are rigidly secured to the horizontal flange of the frame 62, as by screws, the whole forming a rigid construction or gate of patterns. Each of the patterns 61 is complete in itself—that is, none is divided into a number of parts; but each is an entirety in itself, forming the entire mold or counterpart in the sand, and is rigidly attached to or connected with the pattern-carrying frame 62 by the arms or rods 64. By this arrangement we are enabled in many cases to dispense with match-plates and stripping-plates and to obtain castings which are duplicates of each other and are free from fins and offsets. At two opposite sides the frame 62 is provided with V-shaped guide-bars 65 at right angles to the plane of the frame and suitably attached thereto, as by screws 66. The guides 65 are of a size adapted to fit closely against the interior V-surface of the guides 45, hereinbefore mentioned. A vibrating engine 67 is shown in Figs. 3 and 4 as being firmly secured to the pattern-carrier 62. The relatively-long guide-bars 45, 58, and 65 secure that each part of the frame shall move parallel with itself during the drawing of the pattern, and by their close fit against each other they prevent lateral displacement or motion of translation of the pattern-carrying frame and the pattern during the drawing, even when the vibrator is in operation and delivering lateral blows. It is not essential that the patterns be made of one piece, since they may be built up of two or more pieces; but by the use of an undivided pattern or one in which different parts, if employed, are not separated from each other in any way, as by a match-plate, we secure that in many cases where such patterns may be used the molds shall be exact counterparts of the patterns employed.

The cope and drag each may be formed of parts hinged, as at 68, and locked together, as at 69, by a cam-lock.

The construction illustrated in Fig. 5 comprises two mold-frames 70 71, of metal, a match-plate 72, which is held between the frames 70 and 71, the frames and plate being provided with lugs 73 at opposite sides, and dowels 74, whereby the three are held together in a particular position. The guides 45, 58, and 65 may be employed here also. The rapping-engine 67 is attached to the match-plate 72, as are the upper and lower sections 75 of the pattern.

In some cases we provide a frame 76 (see Fig. 1) similar to the cope and drag frames hereinbefore mentioned and fill it with a hard composition 77, of litharge, boiled linseed-oil, and sand, (or this may be replaced by wood, clay, or sand,) which is shaped to support the pattern, as a skew-bevel-gear pattern 61, the frame 76 being rabbeted to receive the frame 62. The frame 76 is provided with guides similar to the guides 58 and adapted to fit on the exterior of the guides 45 of the drag and attached to the frame 76 in a manner similar to that hereinbefore described.

It is remarked that the guides 45, 58, and 65 (and especially guides 45 and 65) have long close-fitting V-shaped bearings on each other and that the said lengthy bearings hold the mold parts and pattern-carrier each in parallelism with itself as it is put in and removed from place in the assembled flask—that is, it cannot wabble or turn as on a pivot or axis and also that each is compelled to move in a rectilinear direction during assemblage and disassemblage. These features of non-wabbling and rectilinear motion constitute important parts of our invention and secure the attainment of several of the objects thereof.

The method of forming a mold by the described cope and drag and the filled frame or match-frame 76 will now be described. The frame 76 is placed upon the table 4, and the pattern-carrier and patterns are put in place, as indicated in Fig. 1, after which the drag 42 is put in position, the guides 45 thereof entering between the guides 65 and 58 of the pattern-carrier and the frame 76, respectively, (see Fig. 1,) and the edges of the frame 42 being notched to receive the bars 64 of the gate of patterns. Sand is now thrown into the drag and pressed down somewhat and may be heaped somewhat above the surface of the drag, and the parts are then placed in position under the rammer 19. The handle 18 is now turned forward, admitting the steam, air, or fluid pressure to the cylinder 3, which is thereby forcibly and quickly thrown upward to bring the sand against the rammer 19. A reverse motion of the lever 18 opens the waste 17, releasing the pressure in cylinder 3, which thereupon drops back to the position shown in Fig. 1. One or more blows may be given to the sand in the drag in this manner, after which any loose sand above the drag is leveled off by a bar or otherwise. In practice, however, we prefer to place a ramming or bottom board 109×, which will pass within the drag on the sand in the drag and to drive the sand by means thereof, the rammer 19 striking on two (or more) battens 110×, secured to the board. The match-frame 76, drag, and pattern-carrier are now inverted, thus bringing the match-frame on top, and the match-frame is then removed, being guided in a straight line or direction and being held in parallelism with itself in such removal by the V-guides above described. In other words, for some of the purposes of this invention the match-frame 76 constitutes a part of a mold. After the match-frame is removed, as described, parting sand is sprinkled over the surface of the sand in the drag. Next the cope-frame is put in place, its guides 58 engaging outside the guides 45 as it is put down on the drag. (See Fig. 4.) Then the flask is centered under the rammer and the cope is filled with sand, a ramming-board being placed on top, if desired, and the operation of ramming is carried out as in the case of the drag above described. After the ramming is completed and the table 4 lowered to the normal position thereof the rammer is turned back, (rods 22 against stops 29.) The vibrator-engine 67 is next started up, the valve at 103 being opened by pressing lever 105 rearward by the knee, and the cope is then lifted from the pattern, (or patterns,) being guided in a straight line and held in parallelism with itself by the guides 45 and 58 during the drawing of the pattern, and is laid aside. Then while engine 67 is still in operation the patterns are drawn from the drag by grasping the handles 63 and lifting the carrier 62 and the patterns being moved in a straight line and in parallelism with themselves during the operation. We remark that by the use of a pattern-carrier which supports the pattern at one or more places or points only along the parting-line or discontinuously, as distinguished from a plate supporting the pattern all around or all along the parting-line, the sand surfaces of the mold parts come into actual contact with each other at all points, forming joint-surfaces of the completed mold during the formation of the mold itself, whereby each part of the mold joint-surface conforms exactly to its opposing surface or part. The result is secured, so to say, by omitting the pattern-carrier at all points forming the joint-surfaces of the completed mold. By "joint-surface" is meant that surface of the sand of each mold part which abuts against a like surface of an opposing mold part, so that wherever each pattern-supporting arm or bar rests during the formation of the mold there is a cavity or open passage which is stopped off, as hereinafter set forth. By this method or arrangement any sand at the parting-line that may break off from the upper mold part during the removal thereof from the pattern, as frequently happens when match-plates are used and also where there is anything like a right angle, rests upon the sand of the lower mold part, so that after the pattern is removed and the cope is replaced this sand resumes its proper place in the completed mold, whereby fins on the casting are prevented or avoided; but in case such sand adheres to a match-plate where divided patterns or their equivalent, a plate having the pattern parts formed integrally therewith, are employed such detached sand cannot be replaced when the mold parts are assembled, whereby fins on the casting are the result. Afterward the channels in the mold formed by the bars 64, which are in but one part of the mold, are closed in any suitable way, as by metal disks or the like placed transversely thereto being forced into the sand or by plugs filling them or in some cases by pressing the adjacent sand into the channels by the fingers, all as at 78, one of the channels being left open as a sprue, if desired.

It is remarked that the engine 67 makes several thousand strokes per minute, thus producing a continuous vibration of the patterns and the carrier or support therefor, owing to the small stroke and the relatively-small mass of the piston $67^d$. The patterns do not appear to enlarge the molds sensibly, as, though they may be replaced, they cannot be drawn again without disturbing the sand except with the vibrator in operation, the action of vibrator apparently being to lessen the adhesion of the sand to the sides of the pattern rather than to displace the sand from said sides, it being borne in mind that the close-fitting guides for the pattern-carrier prevent any but up-and-down motion of the carrier and pattern at such times.

In order to provide that one rapping or vibrating engine may be used in conjunction with any number of pattern plates or carriers, and also to provide for different heights of the pattern-plate above the table 4, the following construction is provided: In the construction illustrated in Fig. 1 the table is formed with an extension 79, to which is attached a vertical sleeve 80. Within the sleeve 80 is a sleeve 81, provided with exterior screw-threads and with nuts 82 above and below the sleeve 80, the last-named sleeve being smooth on its inner surface. The nuts 82 serve to vary or regulate the height of the sleeve 81 in the bearing 80 and to lock it firmly in position. Within the sleeve 81 is a stud or bolt 83, provided with a shoulder 84 to rest upon the upper end of the sleeve 81 and with a screw-thread at its lower end for a nut 85, by which the stud 83 is held in position to turn within the sleeve 81. A head 86 is formed integrally with or attached to the stud 83. The engine 67 in this instance is mounted upon the head 86 to slide lengthwise thereof, as hereinafter described, and is also provided with a vertical standard 87, to which a vertical guide 88 is attached, as by screws 89. An arm 90 is attached to the slide 88, as by a plate 91 and screws 92, to slide up and down thereon, but to have no other motion relatively thereto. The arm 90 is provided with a dowel-pin 93, which is adapted to enter a perforation in an arm 94, attached to the frame 62, hereinbefore mentioned, and to be detached therefrom by sliding the arm 90 upward. The operation of filling the cope and drag with sand and compacting the sand about the patterns is substantially the same as that hereinbefore described, and the vibrations set up by the relatively-fixed engine 67 are transmitted to the frame 62 and the pattern or patterns carried thereby by means of the arm 90, pin 92, and arm 94.

The engine 67 shown in section at Fig. 9 is similar in principle to those shown in Patents No. 533,401, dated January 29, 1895, and No. 582,325, dated May 11, 1897, the arm 87 being formed integrally with one head or end of the cylinder of the engine. The engine 67 shown in the drawings comprises a hollow cylinder having cylindrical ends provided with external screw-threads, a downwardly-extending plate or lug 97, and an obliquely and upwardly extending lug or plate $67^a$, a cap $67^b$, screw-threaded to engage with the one of said threaded-cylinder ends, the head carrying arm 87, which screws onto the other end of said cylinder, metal abutments $67^c$, provided with flanges or disks clamped between the cylinder ends and the cap $67^b$ and head 87, a plunger or piston $67^d$, having reduced cylindrical ends to coact with abutments $67^c$, two circumferential grooves $67^e$, each connected by one or more channels (shown in dotted lines) with the space at the adjacent end of the piston, but not in connection with each other, inlet-channel $67^f$ in the lug $67^a$, and outlet-channels opening into the air. (Indicated in Fig. 9 by a black circle in the left-hand groove $67^e$.) Compressed air is admitted through channel $67^f$ from a tube 100, hereinafter described, and the engine operates similarly to those in the patents above referred to. The engine is attached to a plate 95 by threaded screw-bolts 96, which pass through the plate and enter threaded holes in the lug 97, projecting downward from the body of the cylinder of the engine. The head 86 is formed with parallel vertical sides, which are grooved to receive the lug or plate 97, as illustrated in Fig. 10. By the described construction the engine 67 may be slid along on the head 86 toward and from the center of the table 4, and by means of the stud 83 the head 86 may be swung as upon a pivot, carrying the engine with it.

In the construction illustrated at Fig. 9 the head 86 rests upon a surface, as of a bench or table, and is connected with its pivot $81^a$ by means of a sleeve $83^a$ and an arm 98, to which the head 86 is bolted. It is not essential that the pivot of the head 86 shall be connected with the table 4 or with a molding-machine, nor is it essential that the engine 67 shall move up and down with the table 4 during the ramming of the sand by machinery, inasmuch as the described connection between the engine and the pattern-carrier through the instrumentality of the guide 88 and the up-and-down movable arm 90 permit the up-and-down motion of the mold in ramming sand by machinery, as well as insuring that the patterns shall be vibrated during the drawing of the pattern or mold. The engine 67 may be protected from falling sand by means of a cover 99, as indicated in Fig. 10.

In the machine shown in Figs. 1 and 2 the compressed air is conveyed to the engine 67 by means of rubber tubing 100, which receives the supply of compressed air through a tube 101, and a standard 102, which is provided between the standard 102 and the engine with a check-valve 103, provided with a projecting stem 104, the tube 100 delivering the air to the channel $67^f$ aforesaid. In front of the stem 104 is a vertically-disposed lever 105, pivoted to the table 4 in position to be pressed upon by the knee of the workman, and so to open the check-valve to admit the air to the engine.

For the purpose of blowing sand from the edges of the drag, cope, and pattern-frame a rubber tube 106 is connected with the air-passage in the standard 102 and is provided with a check-valve at 107, having a stem and thumb-piece 108, by means of which the valve may be opened at will. This valve may be similar to that shown in Fig. 13 and need not be shown further. The air issuing from the outlet in the tube 109 at comparatively-high velocity quickly blows the loose sand from the edges or surfaces of the drag and cope and pattern-frame. When not in use the tube 106 may be caught upon hook 110 on the standard 102.

Our invention is not limited in certain features thereof to the use of a machine for ramming the sand, for other modes of compacting the sand in the mold-frames may be used, as ramming by hand or by "squeezing," without departing from our invention as herein claimed. It will thus be seen that our invention contemplates the use thereof in conjunction with any of the present methods of ramming, whether by hand, power-operated machines, or what are known as "hand-presses" or "squeezers" operated by a lever. Our invention is especially adapted to the large class of castings known as "stove" and "ornamental" castings, where a fine surface finish is required. Such finish is usually obtained by the process known as "printing back," and we remark that our invention secures a finer result than present methods and also prevents the "facing" (usually graphitic in its nature) from adhering to the patterns, nor does the molder require to be so skilful in drawing patterns, inasmuch as the guides above described are designed to automatically do the work of holding the patterns steady while being drawn.

Our invention is capable of embodiment in many forms and arrangements without departing from the spirit thereof. We therefore do not limit ourselves to the form thereof shown in the drawings and described above.

Having thus fully and clearly described our invention and its mode of operation, what we claim as new, and desire to secure by Letters Patent of the United States, is—

1. The combination of a mold-frame, an undivided pattern, and an open frame to which said pattern is rigidly but discontinuously connected on the parting-line, said pattern-carrying frame being adapted to rest on or be supported by said mold-frame, substantially as described.

2. The combination of a mold-frame, an undivided pattern, an open frame to which said pattern is rigidly but discontinuously connected on the parting-line, said pattern-carrying frame being adapted to rest on or be supported by said mold-frame, and guides for connecting the mold and the pattern-carrying frames to cause each to remain in parallelism with itself as the pattern is drawn, substantially as described.

3. The combination of a mold-frame, an undivided pattern, and an open frame adapted to rest on or be supported by said mold-frame and having one or more arms or bars rigidly connected to and supporting the said pattern discontinuously on the parting-line, substantially as described.

4. The combination of a mold-frame, V-shaped guide-bars thereon, an undivided pattern, an open frame adapted to rest on or be supported by said mold-frame and to which said pattern is rigidly connected discontinuously on the parting-line by arms or bars, and V-shaped guide-bars on said pattern-carrying frame and coacting with said mold-frame guide-bars, substantially as described.

5. The combination of mold-frames forming a complete flask, an undivided pattern, and an open frame having one or more bars to which said pattern is rigidly fast discontinuously on the parting-line, said second-named frame being partly within and partly without said flask, substantially as described.

6. The combination of a plurality of mold-frames forming a complete flask, an undivided pattern, an open frame having a bar or bars to which said pattern is rigidly fast discontinuously on the parting-line, said pattern-carrying frame being partly within and partly without said flask, and guide-bars on each of said frames coacting with each other to cause each frame to remain in parallelism with itself during the drawing of the pattern, substantially as described.

7. The combination of a mold-frame, an undivided pattern, a frame having a bar or bars to which said pattern is rigidly fast, a vibrator connected with said pattern-carrying frame, and guiding means for preventing lateral motion of translation of said pattern and its carrying-frame as the pattern is drawn and said vibrator is operated, substantially as described.

8. The combination of a plurality of mold-frames forming a complete flask, an undivided pattern, a frame having a bar or bars to which said pattern is rigidly connected, said pattern-carrying frame extending outside of said flask, a vibrator connected with said pattern-carrying frame, and guide-bars arranged to cause each frame to remain in parallelism with itself and to prevent lateral motion of translation of the pattern-carrying frame and pattern during the drawing of the pattern and the operation of the vibrator, substantially as described.

9. The combination of a mold-frame, a pattern, a pattern-carrier, a vibrator, and means for maintaining said carrier and pattern in parallelism with themselves and for preventing lateral motion of translation thereof during the drawing of the pattern and the operation of said vibrator, substantially as described.

10. The combination of a mold-frame, a pattern, a pattern-carrier, a vibrator connected to said carrier, and means for maintaining said carrier and pattern in parallelism with themselves as the pattern is drawn and for preventing lateral motion of translation of the carrier and pattern during the operation of the vibrator, substantially as described.

11. The combination of an open or half-mold frame, a pattern, a pattern-carrier, a vibrator connected with said carrier, and means for maintaining said carrier and pattern in parallelism with themselves as the pattern is drawn and for preventing lateral motion of translation of the carrier and the pattern during the operation of the vibrator, substantially as described.

12. The combination of an undivided pattern, a pattern-carrier rigidly connected with said pattern, said carrier being omitted at all points forming abutting-joint surfaces of the completed mold, a multiple-part mold-frame on or by which said pattern-carrier is supported, and a vibrator connected with said pattern-carrier, substantially as described.

13. The combination of an undivided pattern, a pattern-carrier rigidly connected with said pattern, said carrier being omitted at all points forming abutting-joint surfaces of the completed mold, a multiple-part mold-frame on or by which said carrier is supported, a vibrator connected with said carrier, and means for preventing lateral motion of translation of said carrier and pattern as the pattern is drawn and the vibrator operated, substantially as described.

14. The combination of a multiple-part mold-frame, a pattern-carrier extending to the outside of the mold-frame and there provided with an ear or lug, a vibrator having a vertically-movable member, and a pin-and-hole connection between said lug and member for detachably engaging them together, substantially as described.

15. The combination of a vibrating device provided with a vertical guide, a slide on said guide, a mold-frame, a pattern-carrier extending outside of said mold-frame adjacent to said slide, and means for connecting said slide and extension together.

16. The combination of a flat table, a piston and cylinder for raising and lowering the same, a mold-frame on said table, a rammer above the table, a vibrating device at one side of the table and provided with a vertical guide, a slide on said guide, a pattern in said mold-frame, a pattern-carrier extending outside of the mold-frame and adjacent to the slide, and means for connecting said slide and extension.

17. The combination of a flat table, a relatively-fixed rammer above the same, a vibrating device at one side of the table provided with a vertical guide and movable toward and from the center of the table, and a slide on said guide and provided with engaging means whereby the slide may be connected with a pattern, pattern-carrier, or plate.

18. In a molding-machine, the combination of a flat table, a cylinder and piston operating the same, a rammer above the table, a vibrating device at one side of the table and movable toward and from the center of the table and also swinging horizontally, a vertical guide connected with said vibrator, a slide on said guide, a mold-frame, a pattern within the mold-frame, a pattern-carrier extending outside the mold-frame, and means for connecting said extension and said slide together.

19. The combination of a mold-frame, a pattern therein, and a relatively-fixed vibrating device having an independently-movable member connected to and moving with said pattern as the pattern is drawn.

20. The combination of a mold-frame, a pattern therein, a relatively-fixed vibrator-engine having an independently-movable member, and a pattern-carrier connected with said member and moving the same as the pattern is drawn.

21. The combination of a mold-frame, a pattern therein, a pattern-carrier, guides for maintaining the pattern-carrier in parallelism with itself as the pattern is withdrawn from the mold, and a relatively-fixed vibrator device having an independently-movable member connected with said carrier.

22. The combination of a multiple-part mold-frame, a pattern within the same, a pattern-carrier extending outside the mold-frame, guides for maintaining the carrier and pattern in parallelism with themselves as the pattern is drawn, and a relatively-fixed vibrator-engine having an independently-movable member connected with and moved by said carrier during such drawing.

23. The combination of a multiple-part mold-frame, a pattern within the same, a pattern-carrier, guides for maintaining the mold parts, pattern and carrier each in parallelism with itself as the parts are separated in the drawing of the pattern, and a relatively-fixed vibrator-engine having a movable member connected to and moved by the pattern-carrier as the pattern is drawn.

24. The combination of a multiple-part mold-frame, a pattern within the same, a frame exterior to and supported by the mold and connected to and supporting the pattern, guides for keeping the mold parts, pattern and frame in parallelism each with itself during their separation in the drawing of the pattern, and a relatively-fixed vibrator-engine having an independently-movable part connected to and moved by said frame during the drawing of the pattern.

25. The combination of a mold-support, with a vibrator-engine adjacent the same and provided with means for detachably connecting it with a pattern or a carrier or support therefor.

26. The combination of a mold-support with a vibrating engine adjacent and movable independently relatively to the support and provided with means for connecting the engine detachably with a pattern or a carrier or support therefor.

27. The combination of a mold-support, a vibrating engine adjacent the same, means for varying the position of the engine relatively to the support, and means for connecting the engine with a pattern or a carrier or support therefor while the pattern is in place in the mold and is being drawn.

28. The combination of a mold-support, a vibrator-engine adjacent the same, means for varying the position of the engine relatively to the support in two directions in a plane parallel to the support, and a vertically-movable connector attached to the engine and adapted to coact with a pattern or a carrier or support therefor while the pattern is in place in the mold and is being drawn.

29. In a molding-machine, the combination of a table, a rammer, means for causing relative motion of the table and the rammer, a vibrator-engine attached to and movable in two directions parallel with the plane of the table, a guide rigidly connected with said engine and extending at right angles to the plane of the table, and a connector movable on said guide and adapted to coact with a pattern or a carrier or support therefor while the pattern is in place in the mold and is being drawn.

30. In a molding-machine, the combination of a table, a rammer, means for causing relative motion of the table and the rammer, a vibrator-engine attached to and adjustable in a direction at right angles to the plane of the table, a guide-bar connected to said engine and extending at right angles to the plane of the table, and a connector movable on said guide and adapted to coact with a pattern or a carrier or support therefor while the pattern is in place in the mold and is being drawn.

31. In a molding-machine, the combination of a horizontal table, a rammer, one of said parts moving toward and from the other during ramming, a vibrator-engine attached to and adjustable vertically of the table and movable in or parallel to the plane of the table, a vertical guide connected to said engine, and a connector movable vertically on said guide and adapted to coact with a pattern, carrier or a support therefor while the pattern is in the mold and is being drawn.

32. In molding machinery, a vibrator-engine or agitator provided with a guide and a member slidable along said guide for connecting the engine with a pattern or carrier or support therefor.

HARRIS TABOR.
EDGAR H. MUMFORD.

Witnesses:
E. M. WOOD,
NATHAN LEAVITT.